United States Patent [19]
Ochi

[11] Patent Number: 6,162,528
[45] Date of Patent: Dec. 19, 2000

[54] MAGNETIC RECORDING MEDIUM AND METHOD FOR MANUFACTURING THE SAME

[75] Inventor: Makoto Ochi, Sunnyvale, Calif.

[73] Assignee: Verbatim Corporation, Charlotte, N.C.

[21] Appl. No.: 09/212,414

[22] Filed: Dec. 16, 1998

[51] Int. Cl.$^7$ ................................................. G11B 5/733
[52] U.S. Cl. ................ 428/141; 428/323; 428/694 BA; 428/694 BS; 428/900; 427/131
[58] Field of Search ........................... 428/141, 694 BA, 428/694 BS, 900, 323; 427/131

[56] References Cited

U.S. PATENT DOCUMENTS

| | | | |
|---|---|---|---|
| 5,139,849 | 8/1992 | Takagi et al. | 428/143 |
| 5,496,607 | 3/1996 | Inaba et al. | 428/65.3 |
| 5,534,323 | 7/1996 | Chuujou et al. | 428/65.3 |

FOREIGN PATENT DOCUMENTS

| | | |
|---|---|---|
| 3-17816 | 1/1991 | Japan . |
| 3-224127 | 10/1991 | Japan . |
| 5-73883 | 3/1993 | Japan . |
| 5-298653 | 11/1993 | Japan . |
| 8-293119 | 11/1996 | Japan . |
| 9-320037 | 12/1997 | Japan . |
| 10-134339 | 5/1998 | Japan . |
| 10-134340 | 5/1998 | Japan . |
| 10-154323 | 6/1998 | Japan . |
| 10-162344 | 6/1998 | Japan . |
| 10-208234 | 8/1998 | Japan . |

*Primary Examiner*—Steven A. Resan
*Attorney, Agent, or Firm*—Oblon, Spivak, McClelland, Maier & Neustadt, P.C.

[57] ABSTRACT

A magnetic recording medium including a nonmagnetic support, a lower nonmagnetic layer, and an upper magnetic layer. The nonmagnetic support has a surface. The lower nonmagnetic layer is provided on the surface of the nonmagnetic support. The lower nonmagnetic layer is formed by coating a nonmagnetic coating solution including carbon and a binder. The nonmagnetic coating solution has thixotropy. The upper magnetic layer is provided on the lower nonmagnetic layer and has an average thickness of at most 0.3 $\mu$m. The upper magnetic layer includes ferromagnetic powder. A surface roughness of the surface of the nonmagnetic support is limited according to a degree of the thixotropy of the nonmagnetic coating solution.

17 Claims, 1 Drawing Sheet

MAGNETIC RECORDING MEDIUM AND METHOD FOR MANUFACTURING THE SAME

BACKGROUND OF THE INVENTION

1. Field of the Invention

The present invention relates to a magnetic recording medium and a method for manufacturing the same. More specifically, the magnetic recording medium has an extremely thin magnetic layer having a thickness of at most 0.3 μm.

2. Description of the Related Art

In recent years, in the field of magnetic recording media, recording wavelengths have been shortened and recording tracks have been narrowed in order to achieve high-density recording. Accordingly, improvements of output characteristics, signal-to-noise ratio (S/N) and overwrite characteristics have been required. In the magnetic recording media for high-density recording, in order to improve the output characteristics and the S/N, ferromagnetic metal powder has been made finer, given a higher magnetization and a higher magnetic coercive force and mixed into magnetic paints at a higher density. Further, the surface of the magnetic recording media requires a smoother finish. In order to improve the overwrite characteristics, the magnetic layer has been made thinner. Recently, these characteristics have been significantly improved by adopting a multi layer structure which has a lower nonmagnetic layer provided on a flexible nonmagnetic support, and an upper magnetic layer provided on the lower nonmagnetic layer.

When a conventional contact type magnetic head is used, the friction between the magnetic head and the surface of the upper magnetic layer of the recording medium increases as the surface of the upper magnetic layer is increasingly smoother. Thus the running characteristics deteriorate. On the other hand, in order to improve the running characteristics, if the surface of the upper magnetic layer is roughened, the S/N deteriorates. Accordingly, the running characteristics and electromagnetic performance must be balanced.

Magnetic recording media are disclosed in Japanese Unexamined Patent Publication (Kokai) 5-73,883 (hereinafter referred to as the "883 kokai"), entitled "Magnetic Recording Medium", Japanese Unexamined Patent Publication (Kokai) 5-298,653 (hereinafter referred to as the "653 kokai"), entitled "Magnetic Recording Medium", Japanese Unexamined Patent Publication (Kokai) 9-320,037 (hereinafter referred to as the "037 kokai"), entitled "Magnetic Recording Medium", Japanese Unexamined Patent Publication (Kokai) 3-17,816 (hereinafter referred to as the "816 kokai"), entitled "Magnetic Recording Medium", and Japanese Unexamined Patent Publication (Kokai) 3-224,127 (hereinafter referred to as the "127 kokai"), entitled "Magnetic Recording Medium". The contents of these applications are incorporated herein by reference in their entirety.

In the magnetic recording media disclosed in the 883 kokai, the 653 kokai and the 037 kokai, a lower nonmagnetic layer is provided on a nonmagnetic support. The nonmagnetic layer includes carbon black and a binder. An upper magnetic layer is provided on the nonmagnetic layer.

In the magnetic recording media disclosed in the 816 kokai, a magnetic layer is provided on a nonmagnetic support. The magnetic layer includes magnetic powder and a binder. The surface roughness of the magnetic layer is limited such that the ratio Ns/Ns(t) is between 0.10 and 0.35, wherein Ns represents a number of spikes which project 0.01 μm or more from an average line of a surface roughness sectional curve, and Ns(t) represents a total number of spikes which project from the average line of the surface roughness sectional curve.

In the magnetic recording medium disclosed in the 127 kokai, a magnetic layer is coated on a nonmagnetic support. A number of peaks on the surface of the magnetic layer is limited to 100 or more.

A nonmagnetic coating solution for a nonmagnetic layer provided on a flexible nonmagnetic support includes carbon in order that the nonmagnetic layer has good conductivity. Generally, the solution which includes carbon has thixotropy. Accordingly, because of the thixotropy, a problem arises in that the surface projections on the flexible nonmagnetic support project from the nonmagnetic layer even when the nonmagnetic coating solution is coated on the flexible nonmagnetic support and covers the surface projections. Therefore, the surface projections on the flexible nonmagnetic support form projections on the surface of the lower nonmagnetic layer. Thus, since the surface characteristics of the upper magnetic layer significantly deteriorate, friction characteristics, durability and electromagnetic characteristics deteriorate.

SUMMARY OF THE INVENTION

A first object of the present invention is to provide a magnetic recording medium which has a good durability and good electromagnetic performance. A second object of the present invention is to provide a method manufacturing the magnetic recording medium.

The first object is achieved according to the present invention by providing a new magnetic recording medium including a nonmagnetic support, a lower nonmagnetic layer, and an upper magnetic layer. The nonmagnetic support has a surface. The lower nonmagnetic layer is provided on the surface of the nonmagnetic support. The lower nonmagnetic layer is formed by coating a nonmagnetic coating solution which includes carbon and a binder. The nonmagnetic coating solution has thixotropy. The upper magnetic layer is provided on the lower nonmagnetic layer and has an average thickness of at most 0.3 μm. The upper magnetic layer includes ferromagnetic powder. A surface roughness of the surface of the nonmagnetic support is limited according to a degree of the thixotropy of the nonmagnetic coating solution.

The second object is achieved according to the present invention by providing a new method for manufacturing a magnetic recording medium. In the method, a nonmagnetic coating solution which includes carbon and a binder is coated on a surface of a nonmagnetic support for forming a lower nonmagnetic layer on the nonmagnetic support. A magnetic coating solution which includes ferromagnetic powder is coated on the lower nonmagnetic layer to form an upper magnetic layer having an average thickness of at most 0.3 μm. The nonmagnetic coating solution has thixotropy. A surface roughness of the surface of the nonmagnetic support is limited according to a degree of the thixotropy of the nonmagnetic coating solution.

BRIEF DESCRIPTION OF THE DRAWINGS

A more complete appreciation of the invention and many of the attendant advantages thereof will become readily apparent with reference to the following detailed description, particularly when considered in conjunction with the accompanying drawing, in which.

DETAILED DESCRIPTION OF THE PREFERRED EMBODIMENTS

Figure 1:
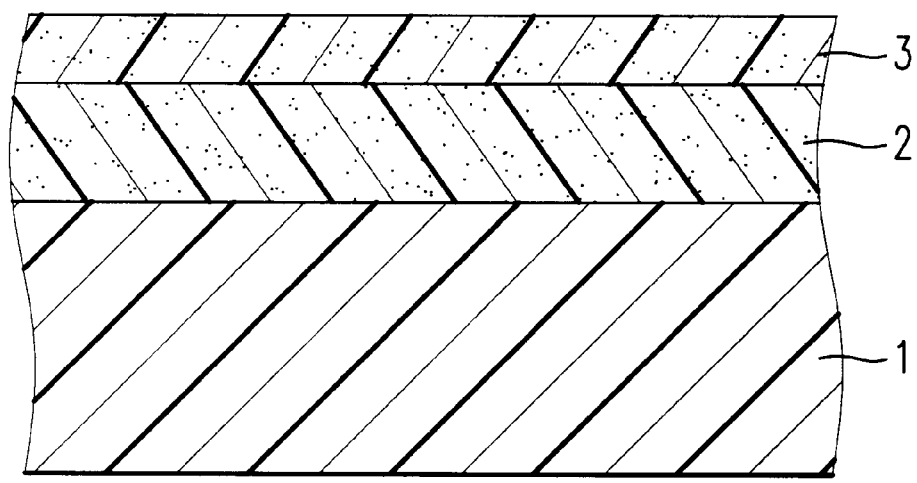
FIG. 1 is an enlarged sectional view of a magnetic recording medium according to an embodiment of the present invention.

The preferred embodiments will now be described with reference to the accompanying drawing.

FIG. 1 shows an enlarged sectional view of a magnetic recording medium, for example, a floppy disk, according to an embodiment of the present invention. Preferably, a magnetic recording medium according to the present embodiment has a maximum recording density of 50 kftpi (kilo flux transition per inch) or more. In the present embodiment, the magnetic recording medium is rotated at 3000 rpm or more and positioned during recording and reproducing in such a manner that a magnetic head slider is not always in contact with the magnetic recording medium and mainly floats above the magnetic recording medium.

Referring to FIG. 1, a lower nonmagnetic layer 2 is provided on a flexible nonmagnetic support 1, and an upper magnetic layer 3 is provided on the lower nonmagnetic layer 2. The lower nonmagnetic layer 2 is formed by coating a nonmagnetic coating solution for the lower nonmagnetic layer 2 on the flexible nonmagnetic support 1. The upper magnetic layer 3 is formed by coating a magnetic coating solution for the upper magnetic layer 3 on the lower nonmagnetic layer 2. If necessary, additional layers may be provided between the lower nonmagnetic layer 2 and the upper magnetic layer 3, or on the upper magnetic layer 3.

As the flexible nonmagnetic support 1, any material which has been proposed to be suitable as a flexible nonmagnetic support can be used. Examples of the flexible nonmagnetic support 1 include polyesters such as polyethylene terephthalate, poly-ethylene-2,6-naphthalate and the like; polyolefins such as polypropylene; cellulosics such as cellulose-triacetate, cellulose-diacetate and the like; aramide; polycarbonates and the like. The flexible nonmagnetic support 1 is formed in a film shape or a tape shape which has a thickness of at most 70 $\mu$m. If the flexible nonmagnetic support 1 is too thick, the magnetic head cannot be appropriately in contact with the flexible nonmagnetic support 1, because the stiffness of the flexible nonmagnetic support 1 becomes too high. Accordingly, it is possible that the electromagnetic performance will deteriorate.

In order to improve the bonding between the lower nonmagnetic layer 2 and the flexible nonmagnetic support 1, surface treating with a surface treating agent such as an aqueous amine solution, trichloroacetic acid, phenol or the like; or corona discharge treating may be performed on the surface of the flexible nonmagnetic support 1 before the lower nonmagnetic layer 2 is formed on the flexible nonmagnetic support 1.

A nonmagnetic coating solution for the nonmagnetic layer includes carbon in order that the nonmagnetic layer has good conductivity. Generally, the solution which includes carbon has thixotropy. The degree of the thixotropy changes according to the weight percent of the carbon included in the nonmagnetic coating solution and the particle size of the carbon. The lower nonmagnetic layer 2 includes carbon black and a binder. As the carbon black, acetylene black, carbon black for color pigment, furnace black or the like can be used. Preferably, the carbon black has an average primary particle size of 50 nm or less, a specific surface area of 100 to 300 m$^2$/g measured by the Brunauer-Emmett-Teller method (hereinafter referred as the "BET method"), a DBP absorption amount of 50 to 100 ml/100 g, a pH value of 2 to 10, water content of 0.1 to 10%, and a tap density of 0.1 to 1 g/ml. Further, the nonmagnetic coating solution includes the carbon black of 80 weight percent or more of a total weight of pigment included in the nonmagnetic coating solution such that the lower nonmagnetic layer 2 has good conductivity.

The flexible nonmagnetic support 1 has a surface on which the nonmagnetic coating solution is coated. A surface roughness of the surface of the flexible nonmagnetic support 1 is based on surface projections on the surface. The surface roughness of the flexible nonmagnetic support 1 is limited according to the degree of the thixotropy of the nonmagnetic coating solution. If the nonmagnetic coating solution has a relatively low thixotropy, the surface projections on the flexible nonmagnetic support 1 do not project from the nonmagnetic layer when the nonmagnetic coating solution is coated on the flexible nonmagnetic support and covers the surface projections. Accordingly, the surface of the lower nonmagnetic layer 2 is smoothed. On the other hand, if the nonmagnetic coating solution has a relatively high thixotropy, the surface projections on the flexible nonmagnetic support 1 project from the nonmagnetic layer even when the nonmagnetic coating solution is coated on the flexible nonmagnetic support and covers the surface projections. Accordingly, the surface projections on the flexible nonmagnetic support 1 form projections on the surface of the lower nonmagnetic layer 2. Therefore, since the surface characteristics of the upper magnetic layer 3 significantly deteriorate, friction characteristics, durability and electromagnetic performance deteriorate.

In the present embodiment according to the present invention, the surface roughness based on the surface projections on the flexible nonmagnetic support 1 is limited according to a degree of the thixotropy of the nonmagnetic coating solution. Accordingly, the surface projections on the flexible nonmagnetic support 1 do not project from the nonmagnetic layer 2 when the nonmagnetic coating solution is coated on the flexible nonmagnetic support 1 and covers the surface projections. Therefore, the surface of the lower nonmagnetic layer 2 can be smoothed. Thus, since the surface characteristics of the upper magnetic layer 3 can be improved, friction characteristics, durability and electromagnetic performance can be improved.

The surface roughness of the flexible nonmagnetic support 1 is limited such that the number of the surface projections which have heights of 50 nm or more is 5 or less per 100,000 $\mu$m$^2$ when the nonmagnetic coating solution includes the carbon black of 80 weight percent or more of a total weight of pigment included in the nonmagnetic coating solution and the carbon black has an average particle size of 50 nm or less. Accordingly, the surface projections on the flexible nonmagnetic support 1 can be covered by the nonmagnetic coating solution. Therefore, the surface of the lower nonmagnetic layer 2 can be smoothed. Thus, since the surface characteristics of the upper magnetic layer 3 can be improved, friction characteristics, durability and electromagnetic performance can be improved.

As the binder, preferably, the resin has a high abrasion resistance, a glass transition temperature of −100 to +150° C., and a number mean molecular weight of 1,000 to 150,000. Examples of the binder include polyurethane resin; polyester resin; cellulosics such as cellulose acetate butylate, cellulose diacetate, nitrocellulose and the like; vinyl chloride resins such as vinyl chloride-vinyl acetate copolymer, vinyl chloride-vinylidene chloride copolymer, vinyl chloride-acrylic copolymer and the like; synthetic rubbers such as styrene-butadiene copolymer and the like; epoxy resin; phenoxy resin and the like. These binders can be used alone or as a mixture of two or more of them. The lower nonmagnetic layer 2 includes 10 to 40 weigh percent of the binder, preferably 15 to 35 weight percent.

Further, preferably, the binder included in the lower nonmagnetic layer 2 forms a crosslinked structure in the lower nonmagnetic layer 2 by reacting with polyisocyanate with low molecular weight having plural isocyanic groups. Accordingly, the mechanical strength of the lower nonmagnetic layer 2 and the resistance to solvents in the upper magnetic layer 3 can be improved. As the polyisocyanate with low molecular weight operating as a curing agent, trimethylol propane adducts to tolylene diisocyanate or the like can be used. Preferably, the low molecular weight polyisocyanate compounds are used in an amounts of 5 to 20 weight percent to the binder. If the low molecular weight polyisocyanate compounds are included in the nonmagnetic layer 2 in amounts of less than 5 weight percent, the nonmagnetic layer 2 does not have enough resistance to a solvent in the magnetic layer 3. If the low molecular weight polyisocyanate compounds are included in the nonmagnetic layer 2 in amounts of more than 20 weight percent, the binder is plasticized. Accordingly, the nonmagnetic layer 2 is easily peeled upon calendering.

Further, the nonmagnetic layer 2 may include a lubricant or a dispersing agent.

The magnetic layer 3 includes ferromagnetic metal powder, alumina particles, carbon black and a binder. As the ferromagnetic metal powder included in the magnetic layer 3, a ferromagnetic metal powder which has a specific surface area of 40 $m^2/g$ or more measured by the BET method can be used. Preferably, the ferromagnetic metal powder has a saturation magnetization $\sigma_s$ of 130 emu or more, and a magnetic coercive force of 2000 Oe (oersted) or more. The ferromagnetic powder particles has an average length of the longitudinal axis of less than 0.2 $\mu$m, preferably less than 0.1 $\mu$m. Preferably, the ferromagnetic metal powder has an acicular ratio of 12 or less in order to increase the density of the ferromagnetic powder in the magnetic layer 3 and to achieve the high density magnetic recording.

Hexagonal plate ferromagnetic powder may be used. Preferably, the hexagonal plate ferromagnetic powder included in the magnetic layer 3 has a specific surface area of 35 $m^2/g$ or more measured by the BET method, an average particle size of 1 to 50 nm, and magnetic coercive force of 1800 Oe or more. The magnetic layer 3 includes the ferromagnetic powder in amounts of 50 to 90 weight percent, preferably 60 to 80 weight percent. If the weight percent of the ferromagnetic powder is too low, it is difficult to increase the recording density. On the other hand, if the weight percent of the ferromagnetic powder is too high, the durability of the magnetic recording medium easily deteriorates.

As the alumina particles, $\alpha$-alumina, $\beta$-alumina or $\gamma$-alumina can be used, and AKP-20, AKP-30, AKP-50, HIT-50 and HIT-100 manufactured by Sumitomo Chemical Co. are available on the market. Alumina particles each of which have an average particle size of 0.4 to 0.8 $\mu$m can be used. Preferably, the alumina particles are dispersed in the magnetic layer 3 such that the area of the alumina particles exposed to the outside on the surface of the magnetic layer 3 is 0.2 to 3.0% of the entire area of the surface of the magnetic layer 3. If the area ratio of the alumina particles is smaller than 0.2%, the durability of the magnetic layer 3 deteriorates. Further, since the alumina particles are gradually removed from the magnetic layer 3, the electromagnetic performance gradually deteriorates. On the other hand, if the area ratio of the alumina particles is larger than 3.0%, the durability of the magnetic head deteriorates. Further, the amount of alumina particles removed from the surface of the magnetic layer 3 increases and the removed alumina particles damage the surface of the magnetic layer 3. Accordingly, the manufacturing yield rate of the product decreases and the error rate during use of the recording media increases.

If the average particle size is less than 0.4 $\mu$m, a large amount of alumina particles are required in order to obtain the required area ratio of the alumina particles and thus the electromagnetic performance deteriorates. On the other hand, if the average particle size is larger than 0.8 $\mu$m, the heights of the alumina particles projected from the surface of the magnetic layer 3 become too high and thus the electromagnetic performance deteriorates.

An average height of the alumina particles exposed on the magnetic layer 3 is 0.015 to 0.060 $\mu$m. If the average height of the alumina particles is lower than 0.015 $\mu$m, portions other than the alumina particles on the magnetic layer 3 are also easily in contact with the magnetic head. Accordingly, the durability of the disk deteriorates. Further, since the friction coefficient of the magnetic layer 3 increases, friction losses between the magnetic head and the magnetic layer 3 of the disk increase. On the other hand, if the average height of the alumina particles is higher than 0.06 $\mu$m, the amount of the alumina particles removed from the surface of the magnetic layer 3 increases and the removed alumina particles damage the surface of the magnetic upper layer 3. Further, since the distance between the magnetic head and the magnetic layer 3 of the disk increases, the electromagnetic performance may be changed.

The ratio of the area of the exposed alumina particles on the surface of the magnetic layer 3 to the entire area of the surface of the magnetic layer 3 is calculated by taking a photomicrograph of the surface of the magnetic layer 3 from above along a direction perpendicular to the magnetic layer 3 by using a scanning electron microscope. Assuming that the surface of the magnetic layer 3 is a flat surface, the ratio of the area of the exposed alumina particles to the entire area of the surface of the magnetic layer 3 is calculated on the basis of the photomicrograph. The area of the alumina particles exposed on the surface of the magnetic layer 3 can be obtained by processing the image of the photomicrograph based on its contrast by a computer. The heights of the exposed alumina particles on the magnetic layer 3 can be measured by using, for example, ESA-3000 manufactured by Ellionics Co., Ltd.

The magnetic layer 3 may includes other inorganic particles in addition to the alumina particles. Examples of the inorganic particles include $\alpha$-iron oxide, silicon nitride, boron nitride, titanium oxide, silicon dioxide, tin oxide, zinc oxide, calcium carbonate, calcium sulfate, barium sulfate, molybdenum disulfide, tungstic oxide, silicon carbide, chromium oxide and the like. Examples of the inorganic particles available on the market include TF-100, TF-120 and TF-140 manufactured by Toda Kogyo Co.; FT-1000 and FT-2000 manufactured by Ishihara Sangyo Co.; STT-4D, STT-30 and STT-65C manufactured by Titan Kogyo Co.; and S-1, G5 and G7 manufactured by Nihon Kagaku Kogyo Co. Among these, the inorganic particles which have high hardness are preferable.

Preferably, the resin as the binder has a high abrasion resistance, glass transition temperature of −100 to +150° C., and a number mean molecular weight of 1,000 to 150,000. Examples of the binder include polyurethane resin; polyester resin; cellulosics such as cellulose acetate butylate, cellulose diacetate, nitrocellulose; vinyl chloride resins such as vinyl chloride-vinyl acetate copolymer, vinyl chloride-vinylidene chloride copolymer, vinyl chloride-acrylic copolymer; synthetic rubbers such as styrene-butadiene copolymer; epoxy resin; phenoxy resin and the like. These examples can be used alone or as a mixture of two or more of them. The upper magnetic layer 3 includes the binder in amounts of 2 to 40 weigh percent, preferably 5 to 25 weight percent.

Further, preferably, the binder included in the upper magnetic layer 3 forms a crosslinked structure in the upper magnetic layer 3 by reacting with polyisocyanate with low molecular weight having plural isocyanic group. Accordingly, the mechanical strength of the lower nonmagnetic layer 2 can be improved. As the polyisocyanate with low molecular weight operating as a crosslinking agent, trimethylol propane adducts to tolylene diisocyanate can be used. Preferably, the low molecular weight polyisocyanate compounds are used in amounts of 10 to 50 weight percent of the binder.

The magnetic layer 3 may include a dispersing agent, a lubricant, an antistatic agent and the like. Preferably, the dispersing agent contains phosphatic ester group such as polyether phosphatic ester, polyoxyethylene alkylphenyl phosphoric ester and the like. The examples of the dispersing agent which contains phosphatic ester group include phosphatidyl choline (lecithin), RE-610 manufactured by Toho Kagaku Co.; PW-36 manufactured by Kusumoto Kasei Co. and the like. Further, in addition to the dispersing agents which includes phosphate group, examples of the dispersing agents include dispersing agents which further include fatty acids having a carbon number of 12 to 18, such as capric acid, lauric acid, myristic acid, oleic acid, linoleic acid and the like; and metallic soaps such as alkali metal and alkaline-earth metal salts. Preferably, the magnetic layer 3 includes the dispersing agent in amounts of 0.1 to 10 weight percent, particularly 1 to 5 weight percent.

As the lubricant, the magnetic layer 3 may include fatty acid esters in amounts of 3.0 to 10.0 weight percent of the magnetic metal powder. If the amount of fatty acid esters is less than 3.0 weight percent, the durability of the magnetic layer 3 may deteriorate. Further, since the viscosity of the magnetic coating solution increases, dispersing characteristics and manufacturing efficiency may be lowered. If the amount of fatty acid esters is larger than 10.0 weight percent, the magnetic head is easily soiled by the lubricant. As the lubricant, aliphatic compounds such as fatty acids, fatty acid metal salts, fatty acid amides, aliphatic alcohols or the like can be used instead of the fatty esters or together with the fatty esters. Examples of fatty acids include oleic acid, lauric acid, myristic acid, paltimitic acid, stearic acid, behenic acid and the like. These are included in amounts of 0.1 to 10.0 weight percent, preferably 1 to 5 weight percent. If too little fatty acid is included in the magnetic layer 3, running characteristics may deteriorate. On the other hand, if too much fatty acid is included in the magnetic layer 3, the durability may deteriorate and the output level may reduce.

Examples of antistatic agents include natural surface active agents such as carbon black, metal, conductive metal compound, saponin and the like; nonionic surface active agents such as alkylene oxides, glycerols and the like; cationic surface active agents such as long-chain alkyl amines, quaternary ammonium salts, compounds containing pyridinium rings, compounds containing nitrogen heterocyclic rings and the like; anionic surface active agents including acidic group such as a carboxyl group, a sulfonic acid group, a phosphoric acid group, an ester sulfate group, a phosphite ester group and the like; and ampholytic surface active agents such as amino acids, amino sulfone acids, ester sulfates and phosphite esters of amino alcohols, and the like. These surface active agents can be mixed.

As a carbon black, acetylene black, carbon black for color pigment, furnace black or the like can be used. Examples of the carbon black include BLACKPEARLS 2000, 1000, 900, 800 and VULCAN XC-72 manufactured by Cabot Co., Ltd.; RAVEN 8800, 8000, and 7000 manufactured by Columbia Carbon Co., Ltd.; and #3750B, #3750, #3250B, #3250, #950, #850B, #650B, #45, #40, #5, MA-77, and MA-7 manufactured by Mitsubishi Chemical Co. Two or more among the examples can be mixed. The surface of the carbon black may be treated by dispersing agents. A part of the carbon black may be graphatized.

As the conductive metal compound, tin oxide, indium tin oxide or the like can be used. The magnetic layer 3 includes the antistatic agent in amounts of 0.1 to 10.0 weight percent.

Above mentioned components are mixed, kneaded, and dispersed to be homogeneous nonmagnetic and magnetic coating solutions. The magnetic recording medium according to the present invention is manufactured by coating the nonmagnetic coating solution for the lower nonmagnetic layer 2 on the flexible nonmagnetic support 1, and then by coating a magnetic coating solution for the upper magnetic layer 3 on the lower nonmagnetic layer 2.

Examples of a solvent include ketones such as methyl ethyl ketone, methyl isobutyl ketone, cyclohexanone and the like; alcohols such as methanol, ethanol, propanol, isopropyl alcohol and the like; esters such as methyl acetate, ethyl acetate, butyl acetate and the like; ethers such as diethyl ether, tetrahydrofuran and the like; aromatic hydrocarbons such as benzene, toluene, xylene and the like; and aliphatic hydrocarbons such as hexane.

The magnetic coating solution for the magnetic layer 3 and the nonmagnetic coating solution for the nonmagnetic layer 1 are made by a conventional method. However, when the magnetic coating solution for the magnetic layer 3 is made, it is preferable that the ferromagnetic metal powder and the alumina particles are dispersed separately. Usually, a first liquid is formed by kneading and dispersing the alumina particles, the binding agent and the solvent. A second liquid is formed by kneading and dispersing ferromagnetic metal powder, carbon black, binding agent, and solvent. Then, the first and second liquids are mixed and dispersed. Since the alumina particles and the ferromagnetic metal powder have different dispersing conditions, the alumina particles disperse too fast under the preferable dispersing condition for the ferromagnetic metal powder. On the other hand, the ferromagnetic metal powder and the carbon black disperses too slow under the preferable dispersing condition for the alumina particles. Accordingly, in the first stage, the alumina particles and the ferromagnetic metal powder are kneaded and dispersed separately.

The lower nonmagnetic layer 2 and the upper magnetic layer 3 are formed by conventional methods such as gravure coating, roll coating, blade coating and extrusion coating by using conventional coating apparatuses. After the nonmagnetic coating solution for the lower nonmagnetic layer 2 is coated and dried, the magnetic coating solution for the upper magnetic layer 3 is coated. According to a well known method, the nonmagnetic coating solution for the lower nonmagnetic layer 2 is coated and dried in a dryer at 50 to 100° C. Then, the magnetic coating solution for the upper magnetic layer 3 is coated when the residual solvent amount in the lower nonmagnetic layer 2 becomes less than $1.5 \times 10^{-15}$ g/$\mu$m$^3$. Accordingly, the binder in the lower nonmagnetic layer 2 is not mixed with the upper magnetic layer 3 when the upper magnetic layer 3 is coated on the lower nonmagnetic layer 2. Therefore, the flatness of the phase boundary between the lower nonmagnetic layer 2 and the upper magnetic layer 3 can be improved.

Further, it is desirable that the thickness of the magnetic layer 3 is 0.3 $\mu$m or less after being dried. Generally, as the upper magnetic layer 3 becomes thicker, it becomes unsuitable for high-density recording because of an increases in self-demagnetization loss and thickness loss. Commonly, before the magnetic layer 3 is dried, it is magnetically oriented by applying a magnetic field such as an oblique magnetic field, an alternating magnetic field, or the like. In this case of high density floppy disks, an orientation degree of 0.95 to 1.05 is preferable. For data tape applications, an orientation degree of 1.6 or higher is preferable. After the magnetic layer 3 is dried, the surface of the magnetic layer 3 is smoothed by calendering. For calendering, rollers made from synthetic resin having heat resistance are preferably used, although metallic rollers may also be used. Preferably, the processing temperature is 70 to 120° C., and the linear pressure is 200 to 500 kg/cm. Furthermore, if the coating solutions include bridging agents such as trimethylol propane adducts to tolylene diisocyanate, the crosslinking reaction between the binder and the crosslinking agent is carried out by curing. During the curing, the magnetic medium is held at 50 to 70° C. for 24 to 160 hours.

The magnetic recording medium of the embodiment according to the present invention has highly smoothed surface and is hardly electrified. Accordingly, problems caused by static electricity or the like hardly occur even though the disk is rotated at a high speed. Therefore, the magnetic recording medium of the embodiment according to the present invention is suitable for a driving apparatus which has a floating type head and rotates the disk at 3,000 rpm or more.

In this embodiment according to the present invention, although it is preferable that the magnetic coating solution is coated on the lower nonmagnetic layer after the nonmagnetic coating solution for the lower nonmagnetic layer is coated and dried, the magnetic coating solution may be coated on the nonmagnetic layer while it is still wet.

The present invention will be further described in the following examples, but the present invention should not be construed as being limited thereto. Note that, in the examples, "parts" means parts by weight.

EXAMPLE 1

The nonmagnetic coating solution for the nonmagnetic layer and the magnetic coating solution for the magnetic layer were made by dispersing the compositions shown in Tables 1 and 2 in a sand mill. Before the magnetic coating solution for the upper magnetic layer was made, polyvinyl chloride resin of 3 parts by weight and α-alumina were dispersed at a solidity composition ratio of 35%. The ferromagnetic metal powder was mixed with polyvinyl chloride resin and polyester polyurethane and dispersed at a solidity composition ratio of 35%. Then, the alumina dispersing solution and carbon black were mixed and further dispersed.

TABLE 1

Compositions of nonmagnetic coating solution

| | |
|---|---|
| Carbon black | 100 parts |
| (An average primary particle size of 24 nm, a specific surface area of 138 m$^2$/g measured by the BET method, DBP absorption amount of 60 ml/100 g) | |
| Polyester polyurethane resin | 30 parts |
| Tridecyl stearate | 13 parts |
| Oleic acid | 2 parts |
| Tetrahydrofuran | 435 parts |

TABLE 2

Compositions of magnetic coating solution

| | |
|---|---|
| Ferromagnetic metal powder | 100 parts |
| (Fe/CO = 70/30, $\sigma_s$ = 154 emu/g, Hc = 2380 Oe, the specific surface area of 49 m$^2$/g measured by the BET method, the length of a longitudinal axis of 0.1 $\mu$m) | |
| Polyvinyl chloride copolymer | 15 parts |
| Polyester polyurethane resin | 3 parts |
| α-Alumina | 20 parts |
| (An average particle size of 0.2 $\mu$m) | |
| Carbon Black | 4 parts |
| (Furnace black, an average primary particle size of 25 nm, a specific surface area of 130 m$^2$/g measured by the BET method, DBP absorption amount of 65 ml/100 g) | |
| Tridecyl stearate | 9 parts |
| Oleic acid | 1 parts |
| Tetrahydrofuran | 400 parts |
| Cyclohexanone | 100 parts |

As the crosslinking agent, diphenylmethylene diisocyanate of 5 parts by weight was added to each of the coating solutions which were made according to the compositions shown in Tables 1 and 2. Then, each of the coating solutions was filtered by a filter with an absolute filtering precision of 1.5 $\mu$m. The polyethylene terephthalate film has a thickness of 62 $\mu$m. A number of surface projections having heights of 50 nm or more projected from an average surface of the polyethylene terephthalate film is 4 or less per 100,000 $\mu$m$^2$. The nonmagnetic coating solution for the lower nonmagnetic layer 2 was coated on the polyethylene terephthalate film by an extrusion coating method and then dried so that the lower nonmagnetic layer 2 had a thickness of 1.0 $\mu$m after being dried. Then, the magnetic coating solution for the upper magnetic layer 3 was coated on the lower nonmagnetic layer 2 by the extrusion coating method and then dried at 80° C. so that the upper magnetic layer 3 had a thickness of 0.2 $\mu$m after being dried. Then, after calendering was performed at 80° C. and 340 kg/cm, the magnetic recording medium thus obtained was stamped out to a disk. Curing was performed by retaining the disk at 70° C. for 48 hours.

EXAMPLE 2

Compared with the compositions of the magnetic layer of the EXAMPLE 1, the ferromagnetic metal powder has the specific surface area of 45 m$^2$/g measured by the BET method, the length of the longitudinal axis of 0.2 nm, $\sigma_s$ of 128 emu/g and Hc of 1650. Other factors are the same as those of the EXAMPLE 1.

EXAMPLE 3

Compared with the compositions of the magnetic layer of the EXAMPLE 1, the ferromagnetic powder comprises hexagonal plate ferromagnetic powder which has $\sigma_s$ of 56 emu/g and Hc of 1900 Oe, the specific surface area of 43 m²/g measured by the BET method, the average particle size of 36 nm, and a plate ratio of 3. Other factors are the same as those of the EXAMPLE 1 .

EXAMPLE 4

Compared with the compositions of the nonmagnetic layer of the EXAMPLE 1, the carbon black has the average particle size of 24 nm, the specific surface area of 90 m²/g measured by the BET method, the DBP absorption amount of 110 ml/100 cc. Other factors are the same as those of the EXAMPLE 1.

COMPARATIVE EXAMPLE 1

Compared with the nonmagnetic support of the EXAMPLE 1, a number of surface projections having heights of 50 nm or more projected from an average surface area of the polyethylene terephthalate film is 7 per 100,000 μm². Other factors are the same as those of the EXAMPLE 1.

COMPARATIVE EXAMPLE 2

Compared with the nonmagnetic support of EXAMPLE 1, PEN support was used. A number of surface projections having heights of 50 nm or more projected from an average surface area of the PEN film was 12 per 100,000 μm². Other factors are the: same as those of the EXAMPLE 1.

COMPARATIVE EXAMPLE 3

Compared with the compositions of the nonmagnetic layer of the EXAMPLE 1, the carbon black was included 70 parts by weight. Thermal black (MT-CI, the primary particle size of 200 to 500 nm, an average primary particle size of 350 m, the specific surface area of 8 m²/g measured by the BET method and a DBP absorption amount of 7 ml/100 g) of 30 parts by weight was added. Other factors are the same as those of the EXAMPLE 1.

COMPARATIVE EXAMPLE 4

Compared with the EXAMPLE 1, the magnetic layer has a thickness of 0.4 μm after being dried. Other factors are the same as those of the EXAMPLE 1.

EVALUATION OF PHYSICAL PROPERTIES

With respect to the above-mentioned magnetic recording media samples, a specific resistance value of the magnetic layer surface area and the electromagnetic performance were measured, and the durability and error characteristics were evaluated. The results are shown in Table 3. The measurement and evaluation method are as follows:

(1) Number of Projections on Flexible Support

Five disks were picked up randomly. The upper magnetic layer and the lower nonmagnetic layer at 10 points of each disk were removed by a THF solvent. The base film was evaluated by using crosslinked surface roughness meter, WYKO. By observing the profile of the roughness, the number of projections having heights of 50 nm or more was counted. Then, the number of projections per 100,000 μm² was calculated by dividing the number of projections by the area in which the number of the projections was counted.

(2) Electromagnetic Performance

The disk was rotated at 3000 rpm. When signals were written on the disk by using a ferrite MIG head at the maximum recording density of 50 kftpi and 10 kftri, an output waveform was detected. Supposing the output voltage in EXAMPLE 1 was 100, the ratio of the output voltage in each example to the output voltage in EXAMPLE 1 was considered as an output (ref %).

(3) Durability

A head was in contact with the disk at 46° C. and under a relative humidity of 20% while the disk was rotated. The portion of the disk which was with the head was observed by the naked eye. The evaluation standards are as follows:

X Scratches occurred before 10,000,000 rotations.

○ Scratches occurred between 10,000,000 and 20,000,000 rotations.

⊙ No scratches occurred after 20,000,000 rotations.

(6) Error

Fifty disks were chosen randomly. These disks were observed through microscope with a magnification of ×50. It was determined as an error when there are five or more surface abnormalities such as dents, projections or the like on the disk surface. The evaluation standards are as follows:

X Twenty or more disks had errors.

○ Nineteen or less disks had errors.

TABLE 3

|  | EX-AMPLE 1 | EX-AMPLE 2 | EX-AMPLE 3 | EX-AMPLE 4 |
|---|---|---|---|---|
| Magnetic Layer d (μm) | 0.2 | 0.22 | 0.21 | 0.2 |
| Base film Ra (nm) | 3 | 3 | 3 | 3 |
| Number of Projections on Base Film | 4 | 3 | 5 | 2 |
| 50 kftpi Output (ref %) | 100 | 85 | 40 | 90 |
| 10 kftpi Output (ref %) | 100 | 110 | 50 | 103 |
| D50 (kftpi) | 62 | 47 | 57 | 60 |
| Durability | ⊙ | ⊙ | ○ | ○ |
| Error | ○ | ○ | ○ | ○ |

|  | COMP.EXA.1 (*1) | COMP. EXA.2 | COMP. EXA.3 | COMP. EXA.4 |
|---|---|---|---|---|
| Magnetic Layer d (μm) | 0.21 | 0.22 | 0.2 | 0.4 |
| Base film Ra (nm) | 4 | 6 | 3 | 3 |
| Number of Projections on Base Film | 7 | 20 | 4 | 3 |
| 50 kftpi Output (ref %) | 99 | 94 | 72 | 94 |
| 10 kftpi Output (ref %) | 103 | 106 | 93 | 208 |
| D50 (kftpi) | 60 | 56 | 41 | 38 |
| Durability | ○ | x | x | ○ |
| Error | x | x | x | ○ |

*1 COMPARATIVE EXAMPLE

Referring to Table 3, when the surface roughness is limited such that a number of the surface projections having heights of 50 nm or more is 5 or less per 100,000 μm², a magnetic recording medium which has a good durability, good electromagnetic performance and a high manufacturing yield rate can be obtained.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A magnetic recording medium comprising:
   a nonmagnetic support having a surface, a roughness of said surface being limited such that a number of surface projections having heights of at least 50 nm is at least 2 and at most 5 per 100,000 μm²;
   a lower nonmagnetic layer provided on said surface of said nonmagnetic support, said lower nonmagnetic layer being formed by coating a nonmagnetic coating solution which has thixotropy and comprises a binder and carbon; and an upper magnetic layer provided on said lower nonmagnetic layer and having an average thickness of at most 0.3 μm, said upper magnetic layer comprising ferromagnetic powder.

2. A magnetic recording medium according to claim 1, wherein said carbon comprises carbon black.

3. A magnetic recording medium according to claim 2, wherein said nonmagnetic coating solution includes the carbon black of at least 80 weight percent of a total weight of pigment included in said nonmagnetic coating solution and said carbon black has an average particle size of at most 50 nm.

4. A magnetic recording medium according to claim 1, wherein said magnetic recording medium has a maximum recording density of at least 50 kftpi.

5. A magnetic recording medium according to claim 1, wherein said ferromagnetic powder has a length of a longitudinal axis of at most 0.2 μm, a saturation magnetization $\sigma_s$ of at least 130 emu, and a magnetic coercive force Hc of at least 2000 Oe.

6. A magnetic recording medium according to claim 1, wherein said ferromagnetic powder comprises plate ferromagnetic powder having a specific surface area of at least 35 $m^2/g$ measured by the BET method, an average particle size of 1 to 50 nm, and a magnetic coercive force Hc of at least 1800 Oe.

7. A magnetic recording medium according to claim 1, wherein 50 percent of said carbon black included in said lower nonmagnetic layer has an average primary particle size of 15 to 30 μm, a specific surface area of 100 to 300 $m^2/g$ measured by the BET method, and a DBP absorption amount of 50 to 100 g/100 cc.

8. A magnetic recording medium according to claim 1, wherein said magnetic recording medium is roatated at 2000 rpm or more, and positioned during recording and reproducing in such a manner that a magnetic head slider is not always in contact with said magnetic recording medium.

9. A magnetic recording medium according to claim 1, wherein said upper magnetic layer further comprises a binder.

10. A magnetic recording medium according to claim 1, wherein said surface roughness of said surface is based on surface projections on said surface.

11. A method for manufacturing a magnetic recording medium, comprising:

making a nonmagnetic coating solution which has thixotropy and comprises a binder and carbon;

making a magnetic coating solution comprising ferromagnetic powder;

providing a nonmagnetic support having a surface, a surface roughness of said surface being limited such that a number of surface projections having heights of at least 50 nm is at least 2 and at most 5 per 100,000 $\mu m^2$;

coating said nonmagnetic coating solution on said surface of said nonmagnetic support for forming a lower nonmagnetic layer on the nonmagnetic support; and coating said magnetic coating solution on the lower nonmagnetic layer to form an upper magnetic layer having an average thickness of at most 0.3 μm.

12. A method for manufacturing a magnetic recording medium according to claim 11, further comprising:

drying said nonmagnetic coating solution after being coated on said surface of said nonmagnetic support.

13. A method for manufacturing a magnetic recording medium according to claim 12, wherein said nonmagnetic coating solution is dried at 50 to 100° C.

14. A method for manufacturing a magnetic recording medium according to claim 12, wherein said magnetic coating solution is coated on said lower nonmagnetic layer when a solvent amount remained in said lower nonmagnetic layer becomes less than $1.5 \times 10^{-15}$ g/μm³.

15. A method for manufacturing a magnetic recording medium according to claim 12, further comprising:

curing the magnetic recording medium after said magnetic coating solution is coated on said lower nonmagnetic layer.

16. A method for manufacturing a magnetic recording medium according to claim 11, wherein said magnetic coating solution is coated on the lower nonmagnetic layer while it is still wet.

17. A method for manufacturing a magnetic recording medium according to claim 11, comprising:

making a nonmagnetic coating solution comprising carbon black of at least 80 weight percent of a total weight of pigment included in said nonmagnetic coating solution, said carbon black having an average particle size of at most 50 nm.

* * * * *